(12) United States Patent
Bhogal et al.

(10) Patent No.: US 8,564,591 B2
(45) Date of Patent: Oct. 22, 2013

(54) RENDERING OF ARTIFACTS IN A VIRTUAL UNIVERSE ENVIRONMENT IN RESPONSE TO USER TAGS

(75) Inventors: Kulvir S. Bhogal, Austin, TX (US); Rick A. Hamilton, II, Richmond, VA (US); Clifford A. Pickover, Yorktown Heights, NY (US); James W. Seaman, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/627,113

(22) Filed: Nov. 30, 2009

(65) Prior Publication Data

US 2011/0128281 A1 Jun. 2, 2011

(51) Int. Cl.
*G06T 15/00* (2011.01)
(52) U.S. Cl.
USPC .......................... 345/419; 345/418; 345/473
(58) Field of Classification Search
None
See application file for complete search history.

(56) References Cited

U.S. PATENT DOCUMENTS

| 5,675,510 | A | 10/1997 | Coffey et al. |
| 5,796,952 | A | 8/1998 | Davis et al. |
| 6,052,730 | A | 4/2000 | Felciano et al. |
| 6,731,314 | B1 | 5/2004 | Chang et al. |
| 7,073,129 | B1 | 7/2006 | Robarts et al. |
| 2003/0050988 | A1 | 3/2003 | Kucherawy et al. |
| 2007/0021200 | A1 | 1/2007 | Fox et al. |
| 2007/0174389 | A1 | 7/2007 | Armstrong et al. |
| 2007/0274519 | A1 | 11/2007 | Cohen et al. |
| 2008/0204450 | A1* | 8/2008 | Dawson et al. ............... 345/419 |

FOREIGN PATENT DOCUMENTS

| WO | 2005099225 A2 | 10/2005 |
| WO | 2007120981 A2 | 10/2007 |

OTHER PUBLICATIONS

U.S. Patent Application of Bhogal et al Entitled Virtual Universe Avatar Activities Review, U.S. Appl. No. 12/238,529, filed Sep. 26, 2008, assigned to IBM.

* cited by examiner

*Primary Examiner* — Said Broome
(74) *Attorney, Agent, or Firm* — Patrick J. Daugherty; Driggs, Hogg, Daugherty & Del Zoppo Co., LPA

(57) ABSTRACT

Methods, services, program products and devices are provided for user-defined configuration of a rendering of a virtual universe domain environment. A first user of a virtual universe domain environment selects or defines an artifact tag comprising rendering data and a protocol for applying the tag to an artifact of the virtual universe domain, the protocol comprising a compliance prerequisite for rendering the tag information to another second user of the virtual universe domain environment. A first user requesting application of a tag to an artifact item within the virtual universe domain, causes a setting or updating of a protocol compliance value. An avatar of another, second user engaging the artifact item causes a virtual universe client of the engaging second user avatar to render the item to the second user in compliance with the tag rendering data if a set or updated compliance value meets a compliance prerequisite.

13 Claims, 3 Drawing Sheets

RENDERING OF ARTIFACTS IN A VIRTUAL UNIVERSE ENVIRONMENT IN RESPONSE TO USER TAGS

FIELD OF THE INVENTION

The present invention generally relates to enabling a user to configure the rendering of a virtual universe (VU) environment, in one aspect to configure an engagement or rendering of a VU environment in response to user or third party selected ratings and categories, in some examples as a function of service provider data and services.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any two or three dimensional graphic image or rendering may be utilized. In order to participate within or inhabit a VU a user creates an agent which functions as the user's account, and upon which the user builds an avatar tied to an inventory of assets the user owns in the VU and associated with the agent.

Many VU's are represented using three dimensional (3-D) graphics and landscapes and are populated by many thousands of users or "residents," wherein the VU often resembles a real world or a fantasy/fictional world in terms of physics, houses, landscapes and in interpersonal communications with other user avatars. VU environments generally comprise a variety of man-made or computer application-generated artifacts, in one aspect representative of items and artifacts understood and recognized by users through their experiences in the real world as well, as through fictional experiences. Real property artifacts may include realistic walkways and streets, buildings (stores, casinos, etc.), parks, plazas, atriums, as well as fantasy environments such as other planets, or worlds of fictional literature and the arts. Personal property artifacts include a wide variety of items such as real-world motorcycles, tokens, clothing, as well as fantasy world potions, spacesuits, armor etc. Moreover, avatar artifacts representing users or automated applications (for example, an automaton greeter programmed to request user information inputs) may comprise a wide variety of visual and behavioral attributes, evidencing real-life human-like appearances and behaviors as well as fantastical powers or character appearances.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life. A VU may also be defined with respect to multiple VU regions, virtual areas of land within the VU often residing on a single server, with each region amenable to provision and management by a one or more participating providers. The size and complexity and variety of resources found in a VU may be directly related to a number of providers participating and hosting regions through server hosting, and the success of a VU may depend upon attracting users and keeping them engaged and participating in the VU environment, thereby adding value to the providers who bear the cost in providing VU region content and services and who may correspondingly expect an appropriate level of multiple-user engagement as a return on their investment, as well as for other users who wish to engage many others in a large virtual community. For example an informational or service-related region managed by a governmental or non-profit organization may desire or expect a given level of VU user engagement and participation, and commercial region providers may desire to engage in a given level of commercial transactions (e.g. number of sales, advertising exposures or paying subscribers) or achieve a level of marketing exposure among VU users.

SUMMARY OF THE INVENTION

Methods, services, program products and devices are provided for user-defined configuration of a rendering of a virtual universe domain environment. Some methods comprise a first user of the virtual universe domain environment selecting or defining an artifact tag comprising rendering data and a protocol for applying the tag to an artifact of the virtual universe domain, the protocol comprising a compliance prerequisite for rendering the tag information to another user of the virtual universe domain environment; the first user requesting application of the tag to an artifact item within the virtual universe domain, the requesting setting or updating a protocol compliance value; an avatar of a second user engaging the artifact item; and a virtual universe client of the engaging second user avatar rendering the artifact item to the second user in compliance with the tag rendering data if the set or the updated compliance value meets the compliance prerequisite.

In another aspect, methods are provided for deploying an application for user-defined configuration of a rendering of a virtual universe domain environment, for example by a service provider who offers to implement, deploy, and/or perform functions for others. In one example a service provider deploys an application defining a tag with data, a virtual universe environment rendering requirement associated with the tag data, and a protocol for applying the tag to an artifact of the virtual universe domain, wherein the protocol includes a compliance prerequisite for rendering tag information to a user of the virtual universe domain environment. The service provider also sets or updates a compliance value of the protocol in response to a request for application of the tag to an artifact item within the virtual universe domain by a first user. In response to an avatar of a second user of the virtual universe domain engaging the artifact item, the service provider causes a virtual universe client of the engaging second user to render the artifact item to the second user in association with the tag data if the set or the updated compliance value meets the compliance prerequisite.

Still further, articles of manufacture comprising a computer usable medium having a computer readable program in said medium are provided. Such program code comprises instructions which, when executed on a computer system, cause the computer system to enable a first user of a virtual universe domain environment to select or define an artifact tag comprising rendering data and a protocol for applying the tag to an artifact of the virtual universe domain, the protocol comprising a compliance prerequisite for rendering the tag information to another user of the virtual universe domain environment. Further, the first user is enabled to request application of the tag to an artifact item within the virtual universe domain, wherein said requesting sets or updates a protocol compliance value, thereby causing a second user's virtual universe client engaging the artifact item to render the item to the second user in compliance with the tag rendering data if the set or updated compliance value meets the compliance prerequisite.

Moreover, systems, articles and programmable devices are also provided for user-defined configuration of a rendering of a virtual universe domain environment. In one embodiment a programmable device has communicating processing means, memory and a network interface. The processing means is configured to enable a first user of a virtual universe domain environment to select or define an artifact tag comprising rendering data and a protocol for applying the tag to an artifact of the virtual universe domain, the protocol comprising a compliance prerequisite for rendering the tag information to another user of the virtual universe domain environment. The processor further enables the first user to request application of the tag to an artifact item within the virtual universe domain, the requesting setting or updating a protocol compliance value, thereby causing a second user's virtual universe client engaging the artifact item to render the item to the second user in compliance with the tag rendering data if the set or updated compliance value meets the compliance prerequisite.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

For convenience purposes, the Detailed Description of the Invention has the following sections
I. General Description
II. Computerized Implementation
I. General Description.

VU environments may offer a wide variety of experiences, and problems arise in that the breadth and scope of the VU environment experience may also include inappropriate activities or situations. For example, VU residents or users may unwittingly engage "griefers" or other avatars that may negatively impact the experience or objectives of the user, or enter public regions of the VU that may be routinely occupied by avatars exhibiting such inappropriate activities. Although some experienced or knowledgeable users may have enough information to actively identify and avoid such problematic avatars or regions, users without such experience or knowledge generally do not have the tools needed to proactively avoid unwanted situations.

Figure 1:
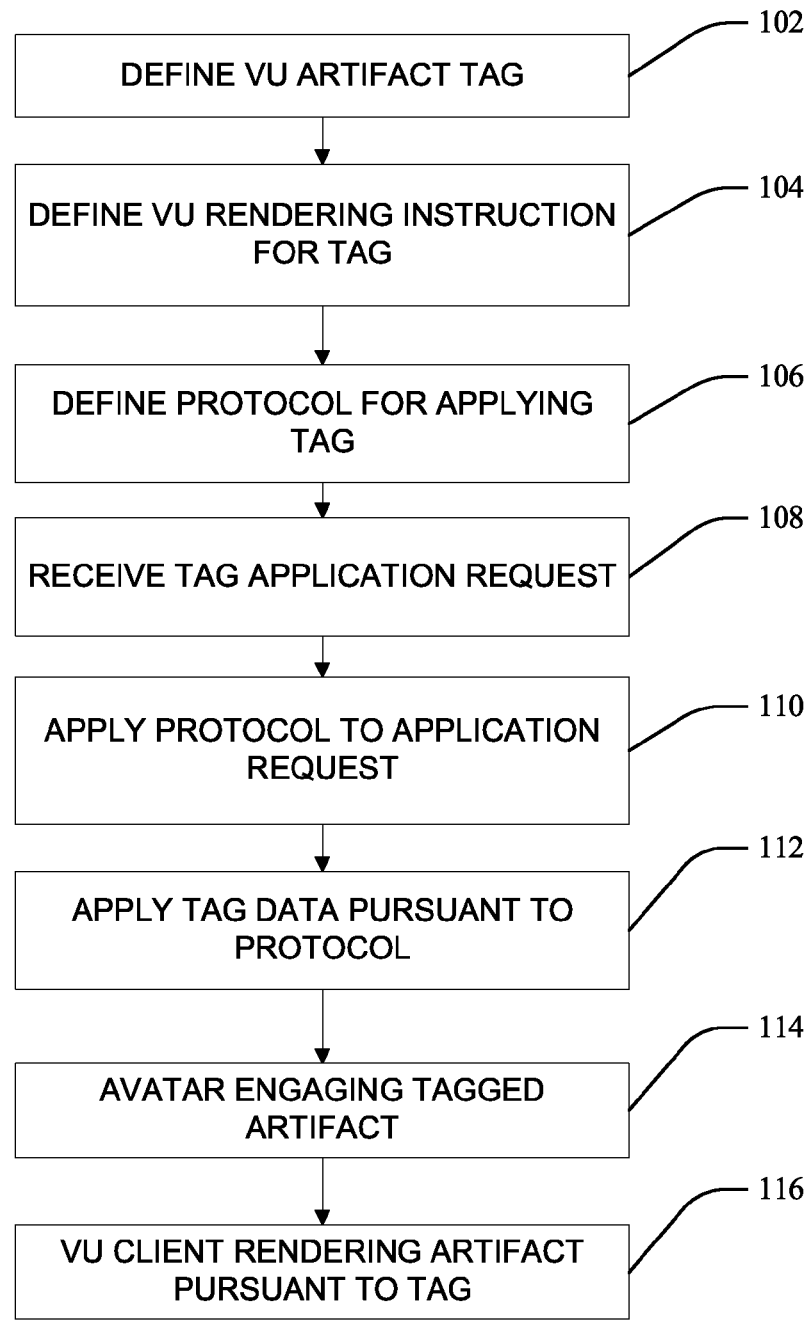
FIG. 1 is a flow chart illustrating a process and system for a user to configure the rendering of a virtual universe (VU) environment according to the present application.

Referring now to FIG. 1, a method and process for enabling a user to configure the rendering of a virtual universe (VU) environment according to the present application is provided. At 102 a tag is defined or selected comprising information for rendering an artifact of the VU through a client application of a VU user, and at 104 a virtual universe environment rendering requirement is defined and associated with the tag information. At 106 a protocol for applying the tag to an artifact of the virtual universe domain is defined, the protocol comprising a compliance value prerequisite for rendering the tag information to another user of the virtual universe domain environment. At 108 a tag application request is made for applying the tag to an artifact item within the virtual universe domain, and the tag is applied pursuant to the protocol at 110 and 112, for example as a result of determining whether the request at 108 meets one or more requirements of the protocol at 110 and 112.

At 114 an avatar of the first user or of a second user engages the tagged artifact item, and at 116 a virtual universe client of the engaging avatar renders the artifact item to the first user or to the second user in compliance with the tag rendering requirement as a function of the tag information. In some embodiments rendering the tag information or the tagged artifact item is a function of user identity, for example differentiating tag information or tagged artifact item rendering decisions with respect to user-tagging status, with tagging first users differentiated from other/second non-tagging VU residents or users, and wherein prerequisite criteria must be met before effecting the artifact item rendering to the other/second users pursuant to the tag information.

Figure 2:
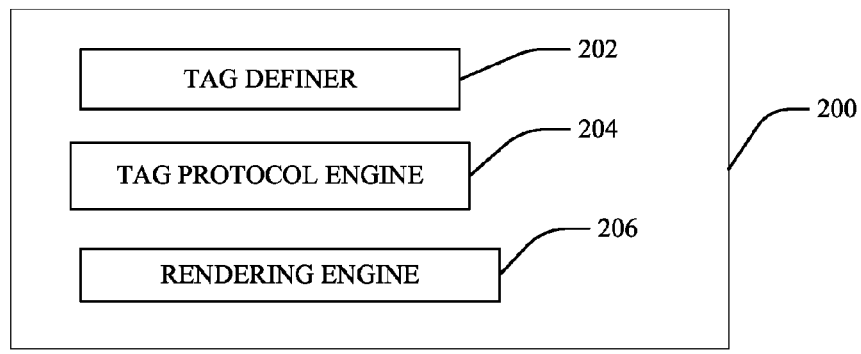
FIG. 2 is a block diagram illustration of a virtual universe client device configured to cause the rendering of a VU environment according to the present application.
Figure 4:
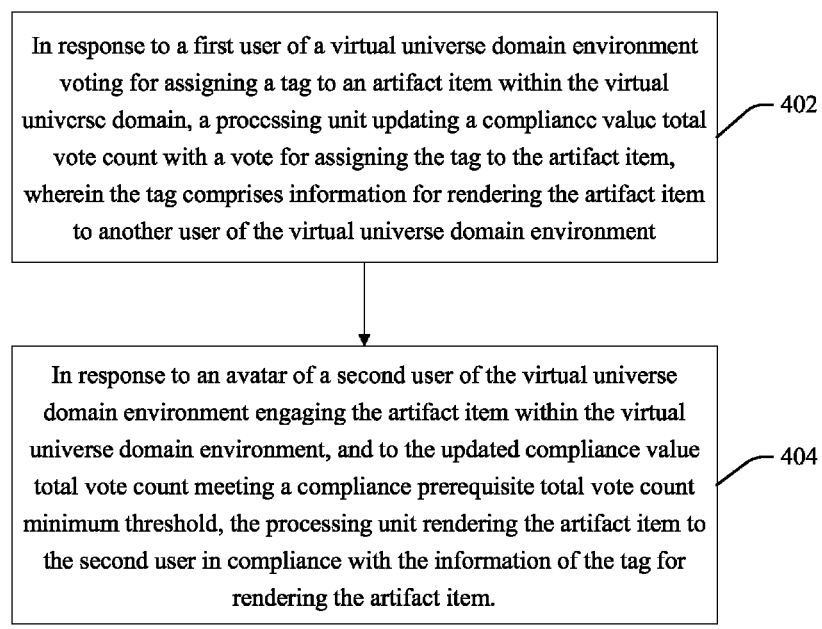
FIG. 4 is a flow chart illustrating an aspect of a user-defined configuration of a rendering of a virtual universe domain environment according to the present application.

FIG. 2 illustrates a logic machine 200 configured to render an artifact item of a VU environment pursuant to tag information associated therewith according to the present application, for example configured to perform method or process elements illustrated in FIG. 1 and described above. The logic machine 200 comprises a tag definition component 202 configured to define information for rendering an artifact of the VU through a client application of a VU user, as well as tagging application information. A tag protocol engine component 204 is configured for applying the tag to an artifact of the virtual universe domain in compliance with one or more tag application protocols, and a rendering engine component 206 is configured to render tagged items and/or associated tag information to users of the VU pursuant to the processes and outputs of the tag definition component 202 and the tag protocol engine component 204. FIG. 4 is a flow chart illustrating a method for user-defined configuration of a rendering of a virtual universe domain environment. At 402, in response to a first user of a virtual universe domain environment voting for assigning a tag to an artifact item within the virtual universe domain, a processing unit updates a compliance value total vote count with a vote for assigning the tag to the artifact item, wherein the tag comprises information for rendering the artifact item to another user of the virtual universe domain environment. At 404, in response to an avatar of a second user of the virtual universe domain environment engaging the artifact item within the virtual universe domain environment, and to the updated compliance value total vote count meeting a compliance prerequisite total vote count minimum threshold, the processing unit renders the artifact item to the second user in compliance with the information of the tag for rendering the artifact item.

Thus the present application provides an enhancement to virtual universe environments which enables users to tag or otherwise identify and label virtual universe material, such as other avatars and regions, with respect to user-defined or user-selected areas of concern, including enabling the user to select, incorporate and utilize service provider or other third-party ratings and information. Users are enabled to create their own definitions and tags for application to other avatars or VU regions, and to share this information with other selected users and third parties, as well as to avail themselves of pre-defined tags. Users may further configure their virtual universe clients to render other avatars, virtual universe regions or any item within a virtual universe in compliance with objectives or requirements associated with such definitions and tags, in one aspect in a high degree of granularity.

According to the present application an artifact of concern may be defined in a wide variety of ways, as will be appreciated by those skilled in the respective arts. For example a person or entity may want to clearly mark a VU facility as an inappropriate region with respect to specific avatar, wherein it has been indicated that objectionable activities or opportunities present within the VU facility should not be presented to that specific avatar. Accordingly, in one embodiment the VU facility itself, or entry points thereto such as doors or boundaries or outer walls of the casino, in some examples as defined by geometric data Universally Unique Identifiers (UUID's) textual coordinates, are tagged to display information to the approaching specific avatar. Rendering the tag information to said specific avatar may include descriptions of the region or activities taking place therein, as well as warnings advising them that they may not or should not enter the VU facility.

A user may also tag or otherwise identify another user's avatar and as an avatar of concern, for example right clicking on the avatar and applying a "watch-out" tag. The tag may be visible to the tagging user, as well as to other user avatars as a function of status and permission data associated with the other user. Thus warning tags applied by a first user may be visible to second users associated with the first user, for example as identified through VU provider or client account settings. Tag data may also be defined as a function of meta-data associated with an artifact: for example, VU artifact creators may provide descriptive tags and data embedded within or otherwise associated with the artifact, and this meta-data may be parsed and used to generate tags according to the present application. Social tags applied by other users may also be considered as metadata.

VU regions considered otherwise generic or innocuous by other users, including by common or conventional norms shared by a majority of residents within a given VU, may also be tagged as associated with behaviors of concern, in some embodiments by a plurality of users through a voting or rating process. For example, a specific area (e.g. a park, commons, store, etc.) may acquire a reputation among VU users as an area known for offensive materials, displays or activities, and according to the present application said specific area may be tagged and thereby identified.

In some embodiments tag information displays, or region rendering responsive to tag information, may be triggered by a specified proximity of an avatar to the tagged region. Thus a proximity value may be defined to warn an avatar far enough away from the tagged region to enable the avatar to avoid the region at a sufficient distance to reduce or eliminate a risk of exposure to objectionable material located therein. For example, a great-enough sensory-limit proximity distance may be selected such that a user will be warned before approaching a region or other artifact of concern close enough to enable the user's GUI to display an objectionable visual artifact at a graphic resolution intelligible to the user. Sensory-limit proximity distances may be defined as a function of tag information regarding the objectionable subject matter, for example providing a greater proximity distance to avoid an exposure to a sign or billboard relative to a smaller proximity value required to avoid discerning the gestures and motions of individual avatars. Warning and other action triggering distances may also be defined with respect to VU-specific geographic attributes, for example a "VU-kilometer" at a normal (non-magnified) avatar perspective; proximity distances may also comprehend encompassing regions, particularly when no other legitimate or non-objectionable artifact or activity is known within a region comprising an artifact of concern.

The avatars of other users or entities may also be tagged or otherwise identified as artifacts of concern, for example tagging another user avatar known or predicted to exhibit inappropriate behaviors. For example, avatars that intentionally obstruct the enjoyment or use of the VU environment by other VU users are sometimes referred to as "griefer" avatars, wherein griefers are sometimes known to spread viruses and other malware to impact other users. According to the present invention griefers may be tagged and differentiated from typical VU users as a result of a tagging avatar observing behaviors in conflict with generally accepted objectives or norms of a given VU environment. In some examples negatively impacting the positive experience of other VU users without a legitimate objective (e.g. preventing another user from completing a game or quest or making a positive social contact) may result in a griefer tag application or request for application.

VU personal property items may also comprise artifacts of concern. Thus the offensive nature of an item may result in a tagging of a given item, and in some embodiments information of possession of a tagged item by a second avatar may be conveyed to another avatar through tag information rendering or displays. Tagging according to the present application also provides advantages in dynamically reacting to changes in item characteristics: for example, an otherwise benign image in an inventory may be subsequently altered or rendered into an objectionable form and provided to another user avatar, and thus embodiments that enable user tagging may quickly respond to and note the new objectionable nature of the item to other user avatars enabled to receive updated or new tag information.

In another aspect accessibility to tag warnings, VU client rendering instructions and other data by other users may be conditional upon permissions and authorizations by a tagging user, other user or a combination of both. Thus tag data provided by a first user may be made accessible to one or more other second users and their avatars through direct or indirect authorization: for example, a first user may directly select each of the other second permitted users and expressly grant permissions, or the first user may give permission to a class of other second users (e.g. everyone on a friend or buddy list). Accessibility may also be granted through membership or affiliation, for example everyone within a local book club or Chamber of Commerce group. In one aspect permissions may be dynamic, for example dependent upon current and good-standing enrollment in an authorized group, wherein a change in membership status may revoke tag viewing or setting permissions.

Tag access and setting may also be provided by services providers, for example through subscriber or account-based methods and systems. Thus some embodiments may provide VU artifact tagging, rating and dynamic updating of the same through a rating or protection service for a fee, in some examples providing a chaperone-like entity that may operate in the background, keeping tags updated and current and thus client avatars effectively protected or warned. Moreover, a wide variety of reporting agencies or rating services may be selected by a user, enabling a high degree of granularity with which a user may tag or view tags of specific areas of concern.

Users may also focus upon narrow issues or attributes, sometimes subsets of larger or more general issues or attributes, and/or may also place more weight or importance on the subset issues or attributes issues, upon which others generally do not attach similar weight or significance. Thus a user may configure the VU environment experience of his or another's avatar to recognize, and in some examples to protect against, other VU artifacts associated with specific activities not otherwise generally considered offensive: for example, activities not offensive under community norms but considered inappropriate by the specific user may thus be specifically tagged as inappropriate relative to that user and/or associated other second users.

In one aspect the user may also be enabled to incorporate one or more of a variety of third-party informational services, which enables users to configure their own virtual universe environments (or the environment of an associated other second user) in order to provide a VU environmental experience in compliance with a plurality of user-specific objectives and requirements. Embodiments that focus upon other avatars may define inappropriate avatar behavior with a variety of degrees of granularity, and with respect to an unlimited variety of issues: this is particularly advantageous in that many behaviors deemed "appropriate" by one user may be totally inappropriate and unacceptable to another user. Enabling a user to select tagging or rating information from one or more trusted other users and third parties helps assure that inappropriate artifacts do not escapee detection or are mislabeled as appropriate, as input from a plurality of trusted others minimizes the chances of a mistake of omission by any one.

Thus avatars who are presently engaging in, or who have in the past engaged in, offensive activities as determined by a trusted-other party will be readily identified to the user according to the present application. In one example "griefer" avatars may thereby be readily identified by reporting and labeling from trusted others who have engaged them in the past. Also, a group of responsible avatars may together define a region to be deemed restricted or inappropriate, for example through a voting process: in one example votes by users with supervisory or trusted-other status may tag a VU park area as a "known offensive activity location."

Application of tags pursuant to application protocols, including compliance value requirements, may be dependent upon and a function of user status as well as confirmation through requiring multiple tagging requests. It will also be appreciated that distinguishing griefer behavior from more benign behavior may be subtle, and that such definitions may be both user and VU-dependent, with activities acceptable in one VU environment or to one user clearly unacceptable in another VU and/or to another user: thus both the status and identity of a tagging user of trusted other providing tagging data may be particularly useful in recognizing and validating griefer tag data. For example, a first user request to tag another second avatar as a griefer may be recognized as a vote for application of a griefer tag, wherein application of the requested tag and/or display of the tag to certain users may be conditional upon additional voting by the first user and/or other users, and wherein a threshold number of votes may be specified as one or more compliance values in order to apply, revise or remove a tag. In some embodiments a compliance value may be status dependent: thus in one example a requesting first user may have a tag applied in response to his or her vote or votes, but the tag may not be displayed to other users until additional votes are cast in confirmation by another user; and in another example a first user initial tagging request may be denied unless confirmation voting by another user is received.

In another aspect users or trusted-others may be ranked or rated, with the tagging data from higher-rated/ranked trusted others weighted relatively higher in making tagging data inputs and determinations. For example, a single vote by a highly-rated user or trusted other may be sufficient to applying a tag or render the tag to other users, wherein a lower-rated user or trusted other may require additional voting inputs to meet the same compliance values.

The relative ratings/rankings of trusted others may also be dynamically updated, providing direct and indirect dynamic updating of tagging data provided there from. For example, a vote already cast to tag an artifact of concern by a first trusted-other may have a relative weighting updated to increase or decrease, resulting in a tagging decision made in response to the re-weighted vote changing as well: a lowered weighting may result in voting data falling below a tag threshold, resulting in removal of a tag from an artifact. Thus griefer behavior definitions through trusted-others and service providers may be dynamic and updateable, with acceptable-unacceptable labeling status changing in response to changing cultural mores, rankings/ratings or reputations of a tagging user and trusted-others and service providers, as well as a function of a maturation or evolving of the VU environment as a whole.

Embodiments according to the present application may also enhance positive aspects and objectives of a virtual universe environment. For example, a user may tag his or her avatar to be readily identified as having a positive social or business objective ("I want to buy a car"), enabling an avatar of a car salesman to quickly identify the user's avatar by his objective and make a positive offer for sale. Correspondingly, the car salesman may visibly tag his avatar as "car salesman," wherein the user avatar encountering the car salesman avatar may initiate a possible sales transaction. Such positive social tags may be displayed universally or selectively, and hence as a function of other user identities or tags.

Tagging may also occur during creation of a VU artifact: for example, the creator of an VU avatar, item or region may include tag data with the artifact, or tags present or already associated with a non-VU item (such as for example a media item or image) may be translated into VU-specific tagging data when the media-related item is introduced into a VU as an artifact. Tagging may also result from analysis of VU artifacts through automated applications and processes, in some embodiments qualitatively evaluating an artifact to identify attributes of concern that indicate tagging, for example by using an image recognition application.

Tag data determinations may also be made through filtering conversations or media streams, and avatar interactions may also be monitored and analyzed, for example including parsing or filtering conversations between other avatars, wherein filtering may contemplate methods and systems that detect the presence of key terms or phrases within text communications, as well as tags and metatag data. Metadata may overtly label or otherwise indicate the nature of items, for example, including embedded text tags labels such as "includes unacceptable images," "contains confidential proprietary data," etc. In some embodiments defining VU artifact tagging data or information may comprise creating instructions as a function of the metatag data: for example, if an item has a metatag label of "offensive" then defining VU artifact tag data for the item comprising instructions to a user's VU client to prevent downloading of the item by the user's avatar. It will also be appreciated that parsing may refer to analyzing input in a specific computer language against the formal grammar of the language, often to validate the input or create an internal representation for use in subsequent processing, as well as analyzing and describing grammatical structures of a sentence in comprehending the meaning of a sentence or term therein: thus parsing may be understood generally as analyzing text items within text communications, as well as tags and metatag data, in order to track activities according to the present application.

Rendering a VU environment in response to tag data may comprise a variety of actions. A user of an avatar or another party (for example including a supervisory entity) may be notified via a graphical user interface (GUI) prompt, a page or a telephone call of tagging data with respect to a VU artifact, for example by a GUI prompt stating "You are a entering a restricted area." A VU client of an avatar may also directly restrict the avatar from entering a restricted area or otherwise engaging an artifact tagged for exclusion rather than simply warning the avatar from doing so, in some embodiments automatically teleporting or transporting the avatar to another region.

Not all item makers may put appropriate tags on their items, nor may social tags applied by other users be accurate. To overcome tag deficiencies service providers may also use a variety of methodology to review and analyze VU item content and make qualitative restricted content determinations with respect to VU artifacts, including directly assessing VU content by human or automated image analysis methodology. Some embodiments may incorporate other services and service providers into restricted content determinations.

As will be appreciated by one skilled in the relevant arts, an "artificial-artificial-intelligence" application or service may also be used in which an automated or GUI interface application uses actual humans to examine an item and make a decision as to appropriateness. Although live human analysis may be labor-intensive and more expensive than automated processes, parties may find the value-added by using human analyzers worth the extra time and expense, and in particular for monitored or supervised avatars which may require a higher standard of care, such as clients who have evidenced prior inappropriate use of company resources.

II. Computerized Implementation.

Figure 3:
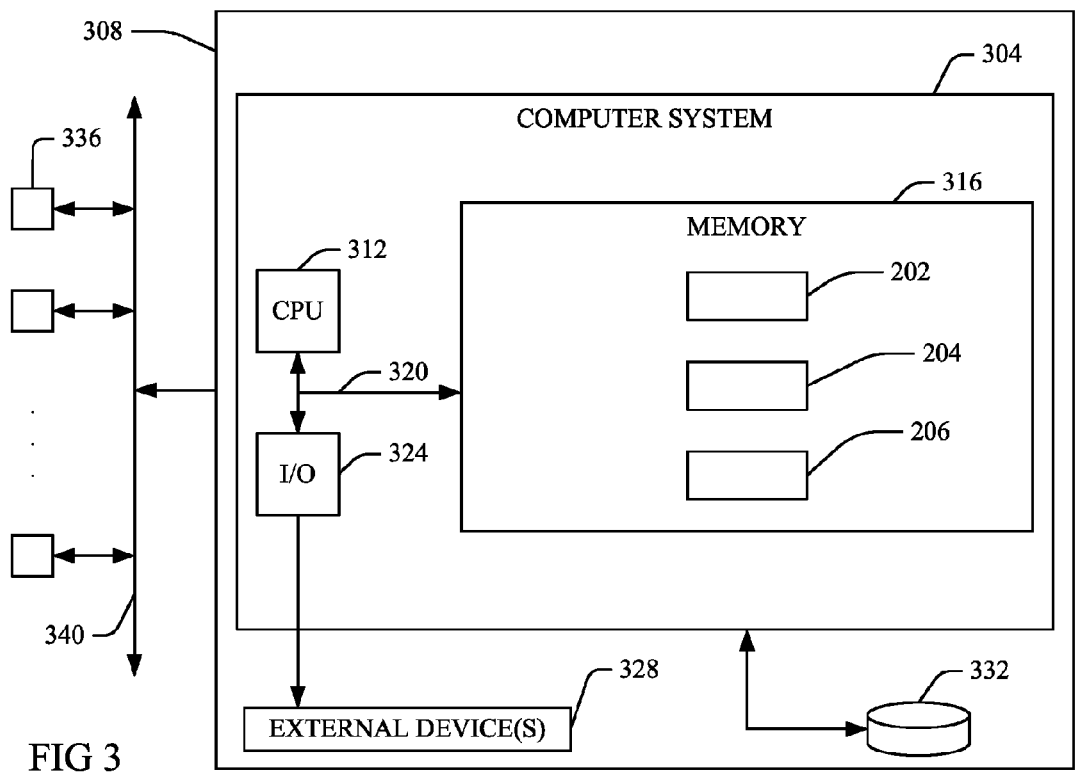
FIG. 3 is a block diagram illustrating an exemplary computerized implementation of a system and method for enabling a user to configure the rendering of a VU environment according to the present application.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer (PC) or other programmable device. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the present invention, including the methods, processes and devices/systems illustrated in the Figures and described herein, including the tag definition component 202, the tag protocol engine component 204, and the rendering engine component 206, which are stored in memory 316 and/or storage system 332. It is to be appreciated that two or more, including all, of the components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. Moreover, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to practice an embodiment according to the present application, including the methods, processes and devices/systems illustrated in the Figures and described herein. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation could be deployed, managed, serviced, etc. by a service provider who offers to implement, deploy, and/or perform the functions of the present invention, including methods, processes and devices/systems according to the present application as illustrated in the Figures and described herein, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure, such as the computer infrastructure 308 that performs the process steps of the invention, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a specific "first" element distinguished from another specific "second" of a plurality of elements, a "primary" distinguished from a "secondary," an "another", etc.) Such identifying adjectives are generally used to reduce indefiniteness, confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for user-defined configuration of a rendering of a virtual universe domain environment, the method comprising:

in response to a first user of a virtual universe domain environment voting for assigning a tag to an artifact item within the virtual universe domain, a processing unit updating a compliance value total vote count with a vote for assigning the tag to the artifact item, wherein the tag comprises information for rendering the artifact item to another user of the virtual universe domain environment; and in response to an avatar of a second user of the virtual universe domain environment engaging the artifact item within the virtual universe domain environment, and in response to the updated compliance value total vote count meeting a compliance prerequisite total vote count minimum threshold, the processing unit rendering the artifact item to the second user in compliance with the information of the tag for rendering the artifact item.

2. The method of claim 1, further comprising:

assigning a relative weight value to each user vote as a function of an identity of a voting user; and determining that the updated compliance value total vote count meets the compliance prerequisite total vote count minimum threshold in response to comparing a total of the relative weight values of all cast votes to a total weighted minimum threshold value of the vote count.

3. The method of claim 2, wherein the step of updating the compliance value total vote count of the artifact item with the vote for assigning the tag to the artifact item comprises updating the relative weight values of all cast votes as a function of a quantity or a frequency of total votes cast by each of a plurality of third parties.

4. The method of claim 3, further comprising:

receiving subsequent voting input data from the plurality of third parties; and dynamically revising the information of the tag for rendering the artifact item as a function of the subsequent voting input.

5. The method of claim 4, comprising revising an assigned weighting of a voting user;

wherein the dynamically revising the information of the tag for rendering the artifact item is a function of the revising the assigned weighting.

6. A method for user-responsive configuration of a rendering of a virtual universe domain environment, the method comprising:

integrating computer-readable program code into a computer system comprising a processing unit, a computer readable memory and a computer readable tangible storage medium, wherein the computer readable program code is embodied on the computer readable tangible storage medium and comprises instructions that, when executed by the processing unit via the computer readable memory, cause the processing unit to:

define a tag comprising information for rendering an artifact item within a virtual universe environment, and a protocol for applying the tag to an artifact item of the virtual universe domain, wherein the protocol comprises a prerequisite total vote count minimum threshold that must be met for rendering the tag information to a user of the virtual universe domain environment;

update a compliance value total vote count with a vote for assigning the tag to the artifact item in response to a request for application of the tag to an artifact item within the virtual universe domain by a first user;

render the artifact item to a second user of the virtual universe domain environment in compliance with the information of the tag for rendering the artifact item in response to an avatar of the second user engaging the artifact item within the virtual universe domain environment, and in response to the updated compliance value total vote count meeting the prerequisite total vote count minimum threshold;

offer the first user or the second user a choice of a plurality of data providers for updating the information of the tag for rendering the artifact item; and update the information of the tag for rendering the artifact item in response to an updating by a one of the plurality of data providers chosen by the user.

7. The method of claim 6, wherein the computer readable program code instructions, when executed by the processing unit via the computer readable memory, further cause the processing unit to update the information of the tag for rendering the artifact item in response to an updating by a one of the plurality of data providers chosen by the user by analyzing metatag data associated with the artifact item.

8. A computer program product for user-defined configuration of a rendering of a virtual universe domain environment, the computer program product comprising:

a computer readable tangible storage medium having computer readable program code embodied therewith, the computer readable program code comprising instructions that, when executed by a computer processing unit, cause the computer processing unit to:

define a tag comprising information for rendering an artifact item within a virtual universe environment, and a protocol for applying the tag to an artifact item of the virtual universe domain, wherein the protocol comprises a prerequisite total vote count minimum threshold that must be met for rendering the tag information to a user of the virtual universe domain environment;

update a compliance value total vote count with a vote for assigning the tag to the artifact item in response to a request for application of the tag to an artifact item within the virtual universe domain by a first user; and render the artifact item to a second user of the virtual universe domain environment in compliance with the information of the tag for rendering the artifact item in response to an avatar of the second user engaging the artifact item within the virtual universe domain environment, and in response to the updated compliance value total vote count meeting the prerequisite total vote count minimum threshold.

9. The computer program product of claim 8, wherein the computer readable program code instructions, when executed by the computer processing unit, further cause the computer processing unit:

to assign a relative weight value to each user vote as a function of an identity of a voting user; and determine that the updated compliance value total vote count meets the compliance prerequisite total vote count minimum threshold by comparing a total of the relative weight values of all cast votes to a total weighted minimum threshold value of the vote count.

10. The computer program product of claim 9, wherein the computer readable program code instructions, when executed by the computer processing unit, further cause the computer processing unit to update the compliance value total vote count of the artifact item with the vote for assigning the tag to the artifact item by updating the relative weight values of all cast votes as a function of a quantity or a frequency of total votes cast by each of a plurality of third parties.

11. A system, comprising:

a processing unit in communication with a computer readable memory and a tangible computer-readable storage medium;

wherein the processing unit, when executing program instructions stored on the tangible computer-readable storage medium via the computer readable memory;

defines a tag comprising information for rendering an artifact item within a virtual universe environment, and a protocol for applying the tag to an artifact item of the virtual universe domain, wherein the protocol comprises a prerequisite total vote count minimum threshold that must be net for rendering the tag information to a user of the virtual universe domain environment;

updates a compliance value total vote count with a vote for assigning the tai to the artifact item in response to a request for application of the tag to an artifact item within the virtual universe domain by a first user; and renders the artifact item to a second user of the virtual universe domain environment in compliance with the information of the tag for rendering the artifact item in response to an avatar of the second user engaging the artifact item within the virtual universe domain environment, and in response to the updated compliance value total vote count meeting the prerequisite total vote count minimum threshold.

12. The system of claim 11, wherein the processing unit, when executing the program instructions stored on the computer-readable storage medium via the computer readable memory, further:

receives subsequent voting input data from a plurality of third parties; and dynamically revises the information of the tag for rendering the artifact item as a function of the received subsequent voting input.

13. The system of claim 12, wherein the processing unit, when executing the program instructions stored on the computer-readable storage medium via the computer readable memory, further updates the information of the tag for rendering the artifact item in response to analyzing metatag data associated with the artifact item.

* * * * *